J. L. CRISLER.
TRANSMISSION APPARATUS.
APPLICATION FILED FEB. 20, 1915.
1,184,625.
Patented May 23, 1916.
2 SHEETS—SHEET 1.
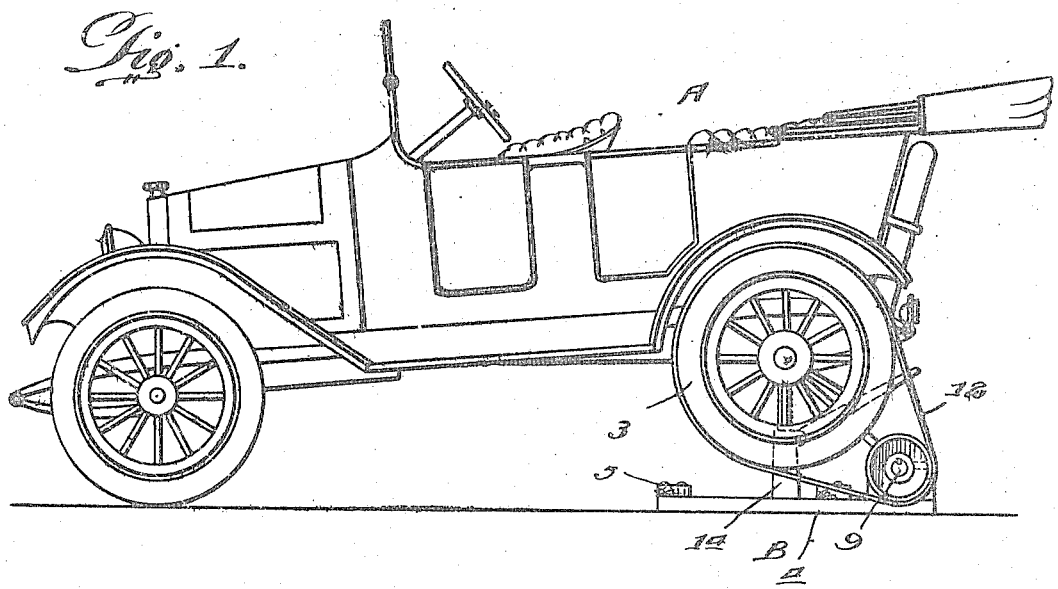
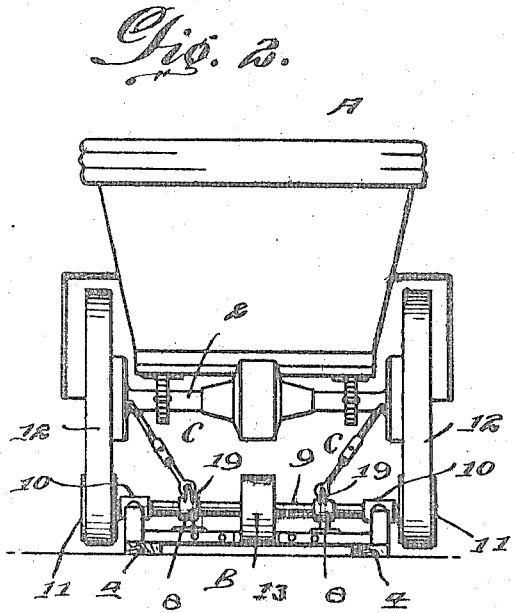
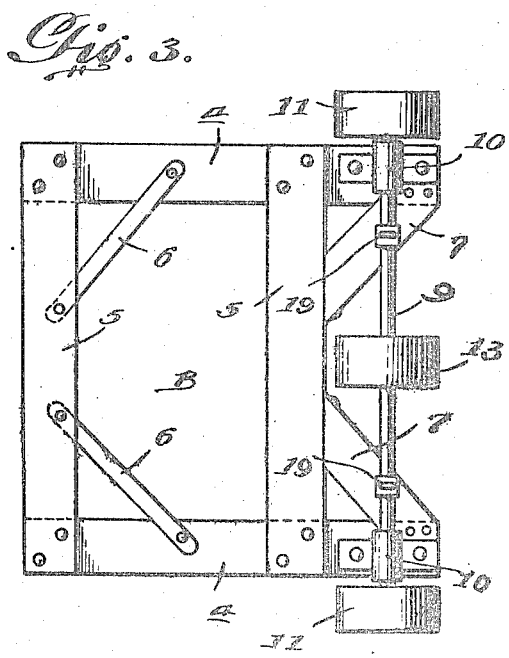
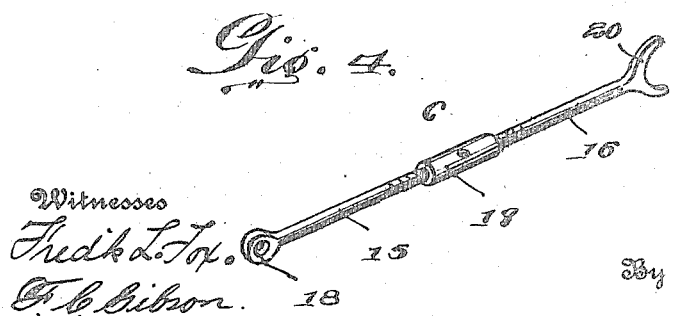
Witnesses
Fredk L. Fox.
G. C. Gibson.
Inventor
Joseph L. Crisler,
By
Attorney

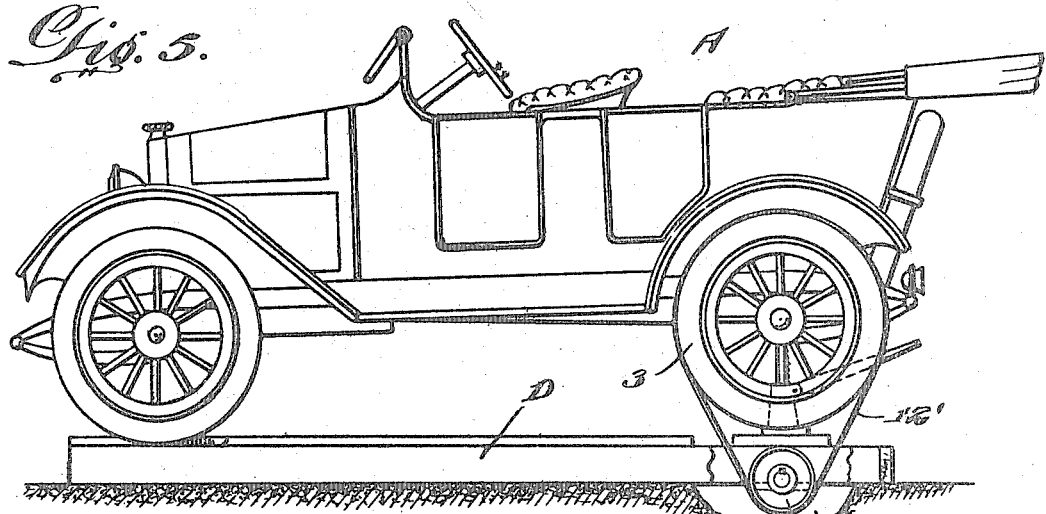
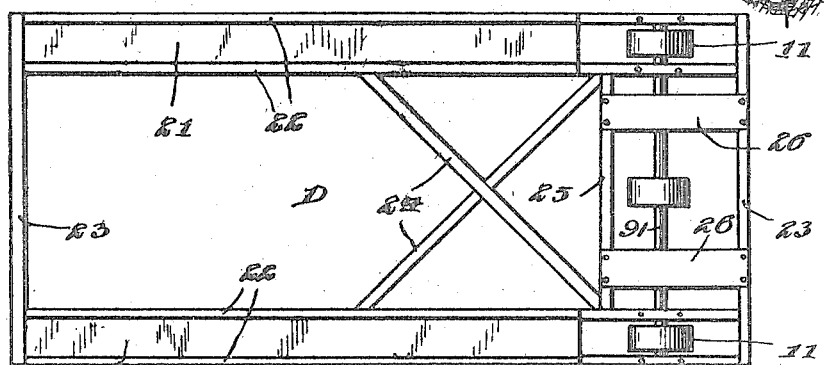
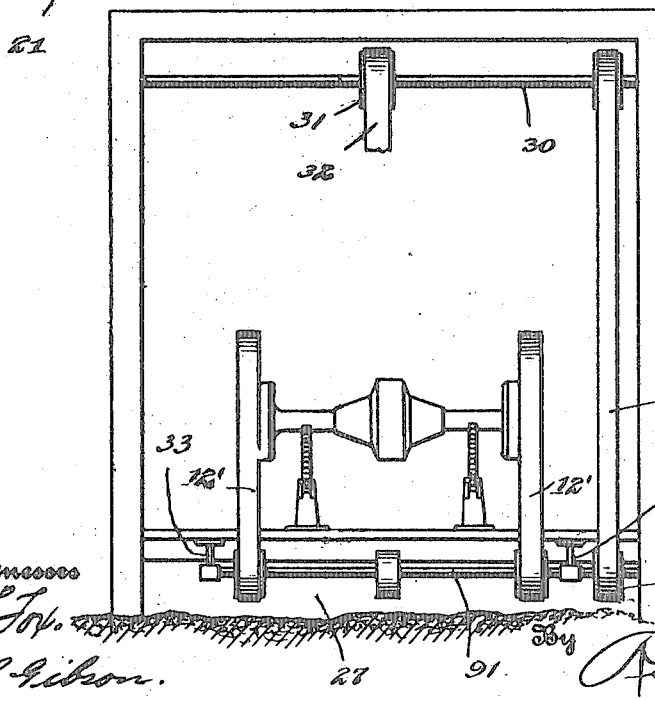

UNITED STATES PATENT OFFICE.

JOSEPH L. CRISLER, OF PERTH, KANSAS.

TRANSMISSION APPARATUS.

1,184,625.    Specification of Letters Patent.    Patented May 23, 1916.

Application filed February 20, 1915. Serial No. 9,550.

*To all whom it may concern:*

Be it known that I, JOSEPH L. CRISLER, a citizen of the United States, residing at Perth, in the county of Sumner and State of Kansas, have invented new and useful Improvements in Transmission Apparatus, of which the following is a specification.

This invention relates to transmission apparatus or means whereby the power of the driving wheels of a motor car or like vehicle, while the body of the car is standing still, may be utilized for driving a transmission shaft mounted in bearings attached to a stationary support or base, the said means embodying driving belts connecting the driving wheels of the motor car with said shaft, and means for elevating the rear axle of the car in order to place said belts under tension.

A further object of the invention is to provide novel means connected with the supporting base for tensioning the driving belts and also laterally bracing and steadying the motor car.

With the above and other objects in view, the invention consists in the novel construction, combination and arrangement of parts, as herein described, illustrated and claimed.

In the accompanying drawings:—Figure 1 is a side elevation illustrating the apparatus of this invention as applied to an automobile which is also shown in side elevation. Fig. 2 is a rear elevation. Fig. 3 is a plan view of the supporting base and the parts connected therewith. Fig. 4 is an enlarged detail perspective view of one of the thrust braces. Fig. 5 is a side elevation similar to Fig. 1 showing a modified arrangement of the belt tensioning means and also a modified form of supporting base. Fig. 6 is a plan view of the supporting base shown in Fig. 5. Fig. 7 is a diagrammatic rear elevation illustrating the connections for driving an overhead shaft.

A generally designates a motor car or automobile of the present day type, embodying the rear axle housing 2 and the rear driving wheels 3.

In carrying out the present invention I employ a supporting base designated generally at B and shown for convenience as comprising the parallel side bars 4, cross bars 5 and corner braces 6 and 7, the corner braces 7 being shown as of sufficient width to provide ample support for a pair of transmission shaft bearings 8 as shown in Fig. 2, 9 designating the transmission shaft. In addition to the bearings 8, other and preferably larger bearings 10 are provided for the shaft 9 and at the outer sides of the bearings 10, the transmission shaft is provided with belt pulleys 11 located at substantially the same distance apart as the driving wheels 3 of the motor car in order to enable driving belts 12 to extend around the wheels 3 and pulleys 11 at both sides of the machine. The shaft 9 is shown as further provided with another belt pulley 13 from which a belt (not shown) may lead to a machine or machinery to which the power is to be transmitted.

In the preferred embodiment of the invention, the transmission shaft 9 and the bearings therefor are arranged as shown in Figs. 1 to 3 inclusive, the motor car being backed until the driving wheels 3 thereof come into contact with the belt pulleys 11. The rear part of the machine is then elevated, the elevating means illustrated in the drawings consisting of a plurality of lifting jacks 14 of any desired type, ordinarily such as those commonly employed for engaging the rear axle housing of a motor car in order to jack the wheels out of contact with the supporting surface.

In addition to the elevating means just referred to, I employ a pair of thrust braces designated generally at C and one of which is illustrated in detail in Fig. 4 wherein it is seen to comprise the two rod-like sections 15 and 16 provided at their adjacent ends with right and left hand threads to be engaged by an internally threaded nut or sleeve 17, the latter device resembling a turn buckle. The section 15 is provided at its outer extremity with an eye 18 adapted to engage an eye 19 on the adjacent bearing 8 above referred to whereby the thrust brace has a jointed connection with the supporting base of the apparatus. The other section 16 of the thrust brace is terminally provided with a fork or rest 20 adapted, as shown in Fig. 2, to engage the rear axle housing adjacent to the brake drum. Two of such thrust braces are employed as shown in Figs. 1 and 2 and the bearings 8 are so located that the thrust braces C incline laterally as well as in the direction of length of the machine, and by diverging upwardly, they not only serve to move the motor car in the direction of its length for placing the belts 12 under tension but they also serve to prevent the car from moving laterally so as to throw the belts 12 off the wheels 3 or the pulleys 11.

Under the arrangement illustrated in Figs. 5 to 7 inclusive, a comparatively long supporting base D is provided, the level thereof being sufficient to support both the front and rear wheels of the machine. This frame comprises parallel side bars 21 forming supporting rails for the front and rear wheels of the car, said bars or rails being provided along their opposite longitudinal edges with upstanding wheel guiding flanges 22. The bars or rails 21 are connected at their opposite ends by tie bars 23 and at an intermediate point by angular braces 24. In order to support the lifting jacks, I provide an additional cross bar 25 and connect the bars 23 and 25 by jack supporting members 26. Under the arrangement just described, the car is brought to rest on the supporting base with the rear axle directly over the transmission shaft 9'. The rear axle is then elevated by means of the jacks until the driving belts 12' are placed under tension. Where the supporting base is placed close to or upon the ground, suitable excavations may be made as shown at 27 to give ample clearance and room for the pulleys of the shaft 9' and the driving belts 12'. Where the mechanism or apparatus is employed in a work shop, for example, the shaft 9' may be provided with an additional band pulley 28 to receive a driving belt 29 extending to an overhead countershaft 30 which is indicated in Fig. 7 may be provided with one or more additional pulleys 31 and belts 32 to drive machines in the shop.

From the foregoing description, taken in connection with the accompanying drawings, it will now be understood that the motor car is simply driven to a point where it bears a certain relation to the transmission shaft 9; it is then elevated so as to carry the tires of the driving wheels clear of the ground or supporting surface. Then by means of the thrust braces C, the car may be moved in the direction of its length to place the driving belts under tension and at the same time said thrust braces act to resist any lateral swaying movement of the elevated rear end portion of the machine, thus making the apparatus reliable and avoiding any opportunity for the motor car to become displaced from its proper relation to the transmission apparatus.

What I claim is:—

1. In transmission apparatus of the class described, the combination with a motor car, of a supporting base, a rotary transmission shaft journaled in stationary bearings on said base, belt pulleys fast on said shaft and located at the same distance apart as the wheels of the motor car, driving belts arranged to transmit the power of the driving wheels of the car to said pulleys and shaft, means supported by said base for elevating the driving axle of the car until the driving wheels thereof are free to turn while the car body is stationary, and means also supported by said base for moving the car in the direction of its length and simultaneously stretching said belts.

2. In transmission apparatus of the class described, the combination with a motor car, of a supporting base therefor, a rotary transmission shaft journaled in bearings on said base, belt pulleys fast on said shaft and located at the same distance apart as the wheels of the motor car, driving belts arranged to transmit the power of the driving wheels of the car to said pulleys and shaft, means supported by the base for elevating the driving axle of the car until the driving wheels thereof are free to turn while the car body is stationary, and means also supported by the base for moving the car in the direction of its length and simultaneously stretching said belts.

3. In transmission apparatus of the class described, the combination with a motor car, of a supporting base therefor, a rotary transmission shaft journaled in bearings on said base, belt pulleys fast on said shaft and located at the same distance apart as the wheels of the motor car, driving belts arranged to transmit the power of the driving wheels of the car to said pulleys and shaft, means supported by the base for elevating the driving axle of the car until the driving wheels thereof are free to turn while the car body is stationary, and means attached to said base for moving the car in the direction of its length and simultaneously tightening said belts.

4. In transmission apparatus of the class described, the combination with a motor car, of a supporting base therefor, a rotary transmission shaft journaled in bearings on said base, belt pulleys fast on said shaft and located at the same distance apart as the wheels of the motor car, driving belts arranged to transmit the power of the driving wheels of the car to said pulleys and shaft, means supported by the base for elevating the driving axle of the car until the driving wheels thereof are free to turn while the car body is stationary, and car-engaging thrust braces having a jointed connection with said base adapting them to be inclined both laterally and longitudinally of the car.

5. In transmission apparatus of the class described, the combination with a motor car, of a supporting base therefor, a rotary transmission shaft journaled in bearings on said base, belt pulleys fast on said shaft and located at the same distance apart as the wheels of the motor car, driving belts arranged to transmit the power of the driving wheels of the car to said pulleys and shaft, means supported by the base for elevating the driving axle of the car until the driving wheels thereof are free to turn while the car body is stationary, and longitudinally extensible car-engaging thrust braces having a jointed connection with said base adapting them to be inclined both laterally and longitudinally of the car.

In testimony whereof I affix my signature in presence of two witnesses.

JOSEPH L. CRISLER.

Witnesses:
GEO. H. HORN,
E. G. JACOBS.